(12) United States Patent
Jensen

(10) Patent No.: US 6,375,404 B1
(45) Date of Patent: Apr. 23, 2002

(54) LOADING PLATFORM SYSTEM

(75) Inventor: Jens Herman Jensen, Ulfborg (DK)

(73) Assignee: Sörensen Hydraulik, Zweigniederlassung, Ulfborg, Filial af Sörensen Hydraulik GmbH, Tyskland (DK)

( * ) Notice: Subject to any disclaimer, the term of this patent is extended or adjusted under 35 U.S.C. 154(b) by 0 days.

(21) Appl. No.: 09/563,304

(22) Filed: May 2, 2000

(30) Foreign Application Priority Data

Dec. 10, 1999 (EP) .......................................... 99124611

(51) Int. Cl.[7] .................................................. B60P 1/44
(52) U.S. Cl. ...................................................... 414/557
(58) Field of Search ................................ 414/556, 557, 414/558

(56) References Cited

U.S. PATENT DOCUMENTS 3,977,544 A * 8/1976 D'Hollander ............... 414/557
4,147,261 A * 4/1979 Dautel et al. ............... 414/557
6,082,958 A * 7/2000 Jensen ......................... 414/557

FOREIGN PATENT DOCUMENTS

DE  2253654  * 5/1974
EP  808747   * 11/1997

* cited by examiner

Primary Examiner—James W. Keenan
(74) Attorney, Agent, or Firm—Klaus J. Bach

(57) ABSTRACT

In a loading platform system for mounting on a vehicle, comprising a lift mechanism support structure, at least a first support arm having an end pivotally connected to the lift mechanism support structure and pivotally supporting at its other end a loading platform for supporting a load and a lifting actuator connected between the lift mechanism support structure and the other end of the support arm for operating the support arm for lifting and lowering the loading platform, the loading platform is pivotally connected to the second end of the first support arm by way of a spring-loaded guide member, which is movably disposed in an opening formed in a guide element mounted on the support arm at the other end thereof.

10 Claims, 3 Drawing Sheets

LOADING PLATFORM SYSTEM

BACKGROUND OF THE INVENTION

The invention relates to a loading platform system for mounting on vehicles, especially trucks, comprising a lifting mechanism, an essentially plate-like loading platform for lifting and lowering a load and at least one lift actuator for lifting and lowering the loading platform. The lifting mechanism includes at least one support arm with a first end by which it is supported on the vehicle so as to be pivotable about a first axis of rotation and a second end which is connected pivotally to the first end of a lifting actuator, a second end of the lifting actuator being rotatably supported on the vehicle.

Such a loading platform system is described for example in EP-A-0808747. Loading platform systems have been known in various designs for a long time. They are often used on trucks in order to be able to unload loads carried by the trucks at the destination that is to lower a load from the truck bed to the ground so that the load can then be further moved by other means. The same is true for the loading procedure of a vehicle that is the load is first deposited on the loading platform when disposed at ground level and lifted to the level of the vehicle load bed and finally moved onto the load bed.

In some designs of loading;platform systems, the loading platform is tilted from a horizontal to a vertical position when the loading procedure is completed. In this position, the loading platform can serve additionally as the rear end wall of the load bed or respectively, of a box-like loading space.

In other embodiments of known loading platform systems, that is, so-called folding loading platforms, the loading platform is not tilted from a horizontal to a vertical position and vice versa; rather these loading platforms are folded after the loading procedure and are then moved below the load bed that is below the rear end of a load bed of a truck.

For the lifting and lowering of the loading platform while in a horizontal position for loading a load onto, and unloading a load from, the loading bed of a truck to street level and from the street level to the level of the load bed of the truck, a so-called lifting actuator is utilized which is operated hydraulically, pneumatically, electrically or in some other way. For the tilting of the loading platform, if such possibility is provided, that is, for the opening and closing of the loading space by movement of the platform from the vertical to the horizontal position and vice versa, a tilting arrangement is used which is actuated hydraulically, pneumatically, electrically or in some other suitable way. Loading platform systems of the type described have at least two actuator arrangements, wherein generally the lift actuator arrangement cooperates with one support structure of a lift and tilting structure which is usually, but not necessarily a parallelogram arrangement. The tilting actuator arrangement cooperates with the other support structure of the lift and tilting structure. However, a tilt actuation structure is only provided if a tilting movement from a horizontal position of the loading platform to the vertical positions and vice versa is necessary.

Known loading platform systems encountered substantial problems during loading and unloading that is under the effects of a force which may reach substantial values depending on the weight of the goods to be moved: As a result of the load disposed on the loading platform, the loading platform may bend relative to the loading bed of the truck so that gaps are formed between the loading platform and the load bed in horizontal as well as in vertical directions. Furthermore, those gaps may vary over the width of the load bed opening. As a result, particularly with heavy loads which need to be moved by the loading platform, vertical thresholds are formed between the loading platform and the loading bed so that the load must often be moved across such threshold by a carriage by hand or by other means.

With the solution presented in EP-A-0 808 747 of the assignee of the present invention, the problems described above have been solved that is no vertical or horizontal gaps between the loading platform arranged horizontally relative to the loading bed of a motor vehicle are formed. In addition, the solution has the very positive effect that the loading platform may be very simple in design, and, because of its design, does not provide for an uneven loading of the support structure. As a result, the support structure remains operative over a long period of time and the service requirements could be reduced to a minimum.

In a lifting support structure of such a loading platform system a substantial torque is generated on the lift support mechanism when the loading platform is in a horizontal position already because of the relatively high weight of the loading platform. Consequently, there is a force effective on the support structure with a substantial vertical force component. When the support structure reaches its end position at the level of the loading bed of the truck that is at the maximizing lift travel of the loading platform and the maximizing lift effect of the lift actuator structure, there is still a small vertical threshold between the level of the loading platform and the level of the load bed of the truck. In this respect, it is pointed out that the lifting mechanism with the support arm and the lift actuator including the pivot or, respectively, axis points of the loading platform can actually not be a totally rigid system since, because of design and material reasons, there is always a certain elastic deformation of the individual elements of the lift mechanism. The elements of the lift mechanism therefore act in a way like springs, particularly the support arms. In order to overcome the deformation caused by the spring action which is responsible for the forming of the gap described earlier the lift actuation arrangement is so operated that the loading platform is lifted actually to the same level as the loading bed of the truck so as to overcome deviations caused by the elastic deformation particularly of the support arms of the lifting mechanisms in order to reduce any gap between the loading platform and the loading bed to zero.

This problem is solved by the loading platform system described above in an elegant manner by providing a second support arm which, at its first end, is interconnected with the first support arm and has at its second end, a pivot axis which extends essentially perpendicularly to the two support arms and by way of which the second support arm is rotatably connected to the loading platform. With the two support arms which are interconnected like pincer arms or spring pliers, the lift actuator operation or movement can be completed by way of the spring action of the two support arms until the loading platform reaches the level of the loading bed while the elastic deformation of the lift mechanism is compensated for.

This design is however relatively expensive and complicated although it is very effective.

It is therefore the object of the present invention to provide a loading platform system, whereby the loading platform can be raised in a simple manner exactly to the desired level so that no vertical gap is formed between the loading platform and the loading bed no matter how large the load on the loading platform is. The system should also be easily installable in existing loading platform arrangements.

SUMMARY OF THE INVENTION

In a loading platform system for mounting on a vehicle, comprising a lift mechanism support structure, at least a first support arm having an end pivotally connected to the lift mechanism support structure and pivotally supporting at its other end a loading platform for supporting a load and a lifting actuator connected between the lift mechanism support structure and the other end of the support arm for operating the support arm for lifting and lowering the loading platform, the loading platform is pivotally connected to the second end of the first support arm by way of a spring-loaded guide member, which is movably disposed in an opening formed in a guide element mounted on the support arm at the other end thereof.

With the arrangement according to the invention a spring action between the second end of the support arm and the respective pivot shaft of the loading platform is provided in a simple manner. There is no need to manufacture the lifting mechanism from highly stressible expensive materials so that these parts, especially the lifting arms can be manufactured relatively inexpensively. In addition, the solution according to the invention has the advantage that the elasticity modules required for a particular application can be accommodated in a simple manner by a suitable selection of the spring means without the need for changing the design of the lifting mechanism, especially the support arms. The solution proposed by the present invention can also be realized in a simple manner.

As spring means, any type of spring may be utilized such as rubber springs, tension springs, leaf springs spiral springs, torsion rod springs coil or coil cone springs or air strut springs. Preferably, however, a compression spring is used or, in another advantageous embodiment of the loading platform system, a hydraulic and/or pneumatic spring is utilized.

In order to ensure in a simple manner that between the pivot axis of the loading platform and the respective second end of the support arm the smallest possible horizontal play with respect to the plane on which the vehicle with the loading platform system is disposed, is achieved, the loading platform system is preferably so designed that the spring means is effective between a guide structure disposed at the second end of the support arm and a guide element which is disposed in an opening of the guide structure so as to be movable back and forth therein. The guide structure and the opening in the guide structure which serves as the direct guide means for the guide element which is movably disposed therein may have any shape that is rectangular cross-sections of the opening and of the guide element are possible. However, the guide element may also be movably disposed in a guide opening, which has a circular cross-section.

At the end of the guide element remote from the guide structure, there is preferably provided a shaft element whose axis forms the pivot axis of the loading platform. In this way, it becomes advantageously possible to form the guide element and a sleeve forming a shaft as a single element defining the axis rotation for the loading platform. But it is also possible to provide, at the remote end of the guide structure, a shaft bolt which extends into correspondingly formed openings or sleeves in the loading platform.

Since a loading platform system is generally mounted on a vehicle where it is subjected to a rough environment that is to moisture, dust and other ambient contaminations, sometimes snow and ice, also salt as it is spread on the streets in winter, it is advantageous to enclose the spring means in a protective enclosure which can be rapidly exchanged if it should become brittle, damaged or otherwise unuseable.

The protective enclosure may be for example an elastic bellows of an elastomer material such as rubber or plastic.

The support arm of the loading platform system does not need to comprise a single arm. It may be advantageous to provide two arms arranged in parallel spaced relationship. In this way, the stability of the support arm arrangement may be improved in a simple manner. The support arm itself may have any suitable cross-section, that is, it may be circular and/or plate-like. If the support arm is tubular or the two spaced support arms are tubular, commercially available tubes may be used for the manufacture of the support arms whereby manufacturing of the arms is simplified and their costs are reduced.

The situation is similar for support arms, which are essentially plate-like. Thin plate-like unfinished structures may be used from which the arms can be stamped out or cut out.

In order to improve the stability of the support arms in an embodiment wherein the support arms are formed by two spaced support arm elements the support arm elements are preferably interconnected by at least one bracing structure.

Below the invention will be described in greater detail with respect to a particular embodiment on the basis of the schematic drawings.

DESCRIPTION OF THE PREFERRED EMBODIMENTS

Figure 1:
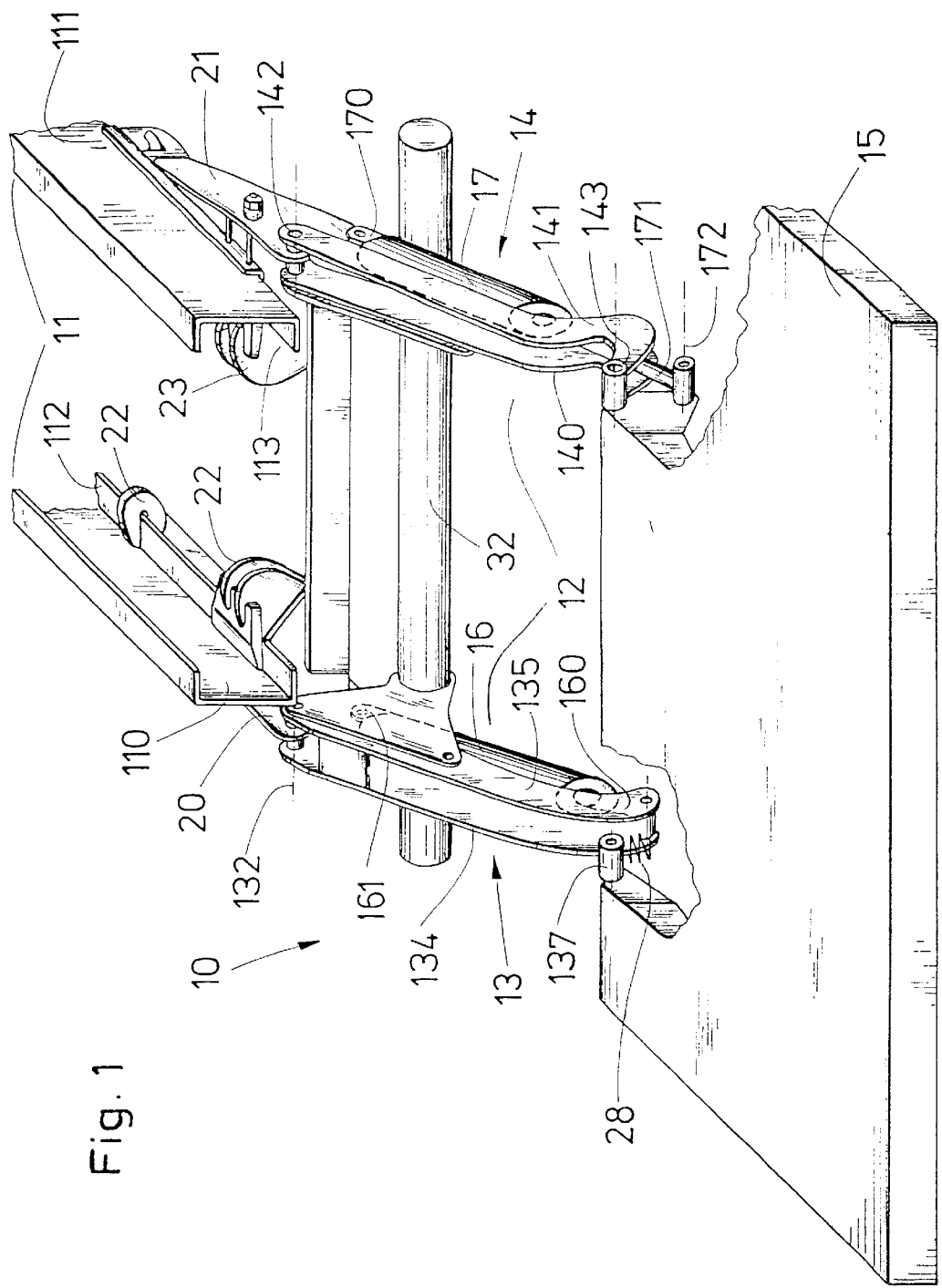
FIG. 1 is a perspective representation of a loading platform system according to the invention, which is mounted on horizontal webs of the support frame of a vehicle wherein the loading platform is shown in its lowered position.
Figure 2:
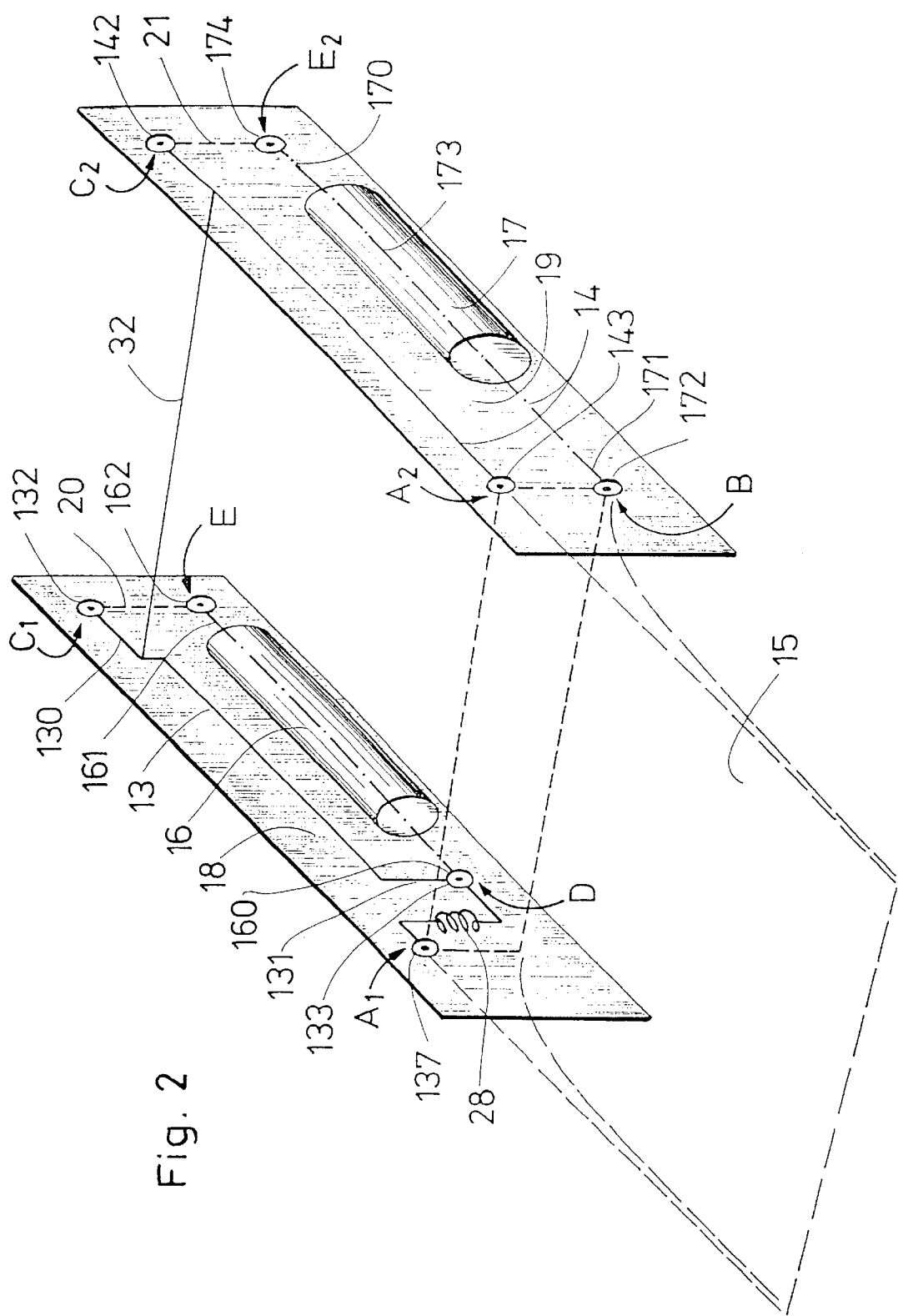
FIG. 2 shows schematically the elements of the support mechanism and also of the tilting mechanism as well as the lifting actuators connected thereto and also a part of the tilting actuators as part of the lifting mechanism.

First reference is made to the loading platform system 10 as shown in FIG. 1, whose basic design is described with reference to FIG. 1. The loading platform system comprises essentially at least one lift support structure 12. As shown in FIG. 1, a particular form of the lift structure 12 is namely a common lift and support structure 12. The combined lifting and support structure 12 comprises at least a first support arm 13 (first support structure) and at least a second support arm 14 (second support structure) which are mounted on a vehicle 11 in parallel spaced relationship by way of mounting structures 20, 21 shown as examples. The first and the second support arm 13, 14 together with the mounting elements 20, 21 and the second arm 14 together with a tilting actuator 17, form a parallelogram-like structure as shown in FIG. 2 and as it will be explained in greater detail further below. An essentially flat loading platform is rotatably connected to the first and second support arm 13, 14 for lifting and lowering a load (shown without load) and, if provided for, also for the closing of a storage space of a vehicle 11 (also not shown). A lifting actuator 16 is connected to the firsts support arm 13 for lifting and lowering the loading platform 15. The tilting actuator 17, which is provided for the tilting of the loading platform from a horizontal to a vertical position and vice versa cooperates with the second support arm 14 and is part of a parallelogram structure.

The first support arm 13, shown in FIGS. 1 and 2 on the left side, comprises, in the embodiment as shown in the figures, two essentially parallel spaced support elements 134, 135 which are supported on a mounting structure 20 so as to be rotatable about a first pivot axis 132. At the second pivot axis 133 which is disposed at the opposite end 131 of the first support arm 13 or, respectively, the first support elements 134, 135, the first end of the lifting actuator 16 is connected to the first support arm 13, see also FIG. 4. The second end of the lifting actuator 16 is rotatably connected to the mounting structure 20. However, the support arm 13 may consist of a single arm.

The second support arm 14, which is similar in shape as the first support arm 13 also comprises two essentially parallel spaced support arm elements 140, 141, which are mounted rotatably about a first axis of rotation 142 on the mounting structure 21. The second pivot axis 143 at the other end of the support arm elements 140, 141 extends essentially perpendicularly to the first support arm 140, 141 and parallel to the first pivot axis 142. At the pivot axis 143, the two support arm elements 140, 141 are pivotally connected to the loading platform 15. The support arm 14 however may also be a single member support arm.

The tilt actuator 17 is provided, in a way, as a leg of the parallelogram-like second support arm 14—see FIG. 2. It has a first end 170 at which it is mounted to the mounting structure 21 so as to be rotatable about an axis of rotation 174. At its second end 171, the tilt actuator 17 is connected to the loading platform 15 so as to be rotatable about an axis of rotation 172, which extends essentially perpendicularly to the longitudinal axis of the tilt actuator 17. The theoretical longitudinal axis 173 extends in the support structure 12 shown in the figures essentially in the plane forming the pivot plane of the second support arm 14, see the area in FIG. 2 which has been darkened for a better visual conception of the representation.

FIG. 1 shows, in an exemplary manner, the lifting scheme of the support mechanism in a form in which it can lift the platform 15 and also tilt the platform. It show the first support arm 13 with the lift actuator 16 and it shows the second support arm 14 with the tilt actuator 17. In the representation of FIG. 2, the force application points of the lifting actuator 16 and the tilt actuator 17 are disposed in the lift support structure 12 in the respective plane 18 defined by the pivot points A1, C, D, E of the pivot axes 137, 132, 133, 162 of the first support arm 13 and, respectively, in the plane 19 defined by the pivot points $A_2$, B, $C_2$, $E_2$ of the pivot axes 143, 172, 142, 174, of the second support arm 14. It is pointed out however that neither the previously mentioned force application points of the lift actuator 16 nor the force application points of the lift actuator 17 need to be disposed at the pivot points of the pivot axis for a realization of the invention. Although, this may be advantageous other designs of the loading platform system 10 are possible wherein the force application points of for example the lift actuator 16 are disposed partially or fully in the plane 18 of the pivot points $A_1$, $C_1$, $D_1$, E, of the pivot axes 137, 132, 133, 162 of the first support arm 13 arm. And if the loading platform system 10 includes also a tilt arrangement, the pivot points $A_2$, B, $C_2$, $E_2$ of the pivot axes 143, 172, 142, 174, which are shown disposed in the plane 19 of the second support arm 14, may be only partially disposed in that plane or all may be disposed in that plane.

The respective mounting structures 20, 21—see FIG. 1—are part of the parallelogram-like structure of support arms 13, 14. The mounting structures 20, 21 may consist of flat sheet metal elements in which the shaft sleeves of the pivot axes 132, 162, 142, 174 can be mounted in a simple manner. The mounting elements 20, 21 are attached to the support frame 110, 111 of the vehicle 11 by bolts or by separate clamping elements 22, 23.

Figure 3:
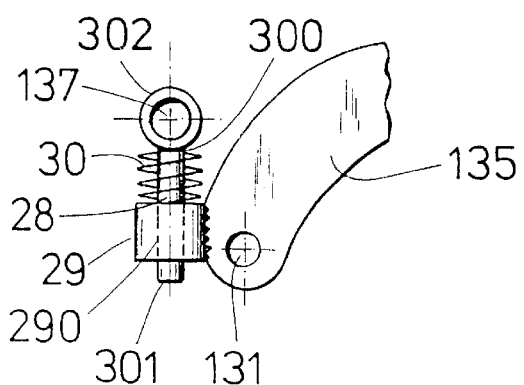
FIG. 3 is a side view showing part of the second end of the support arm on which a guide member is mounted which has an opening in which a guide element engaged by a spring means is movably disposed.
Figure 4:
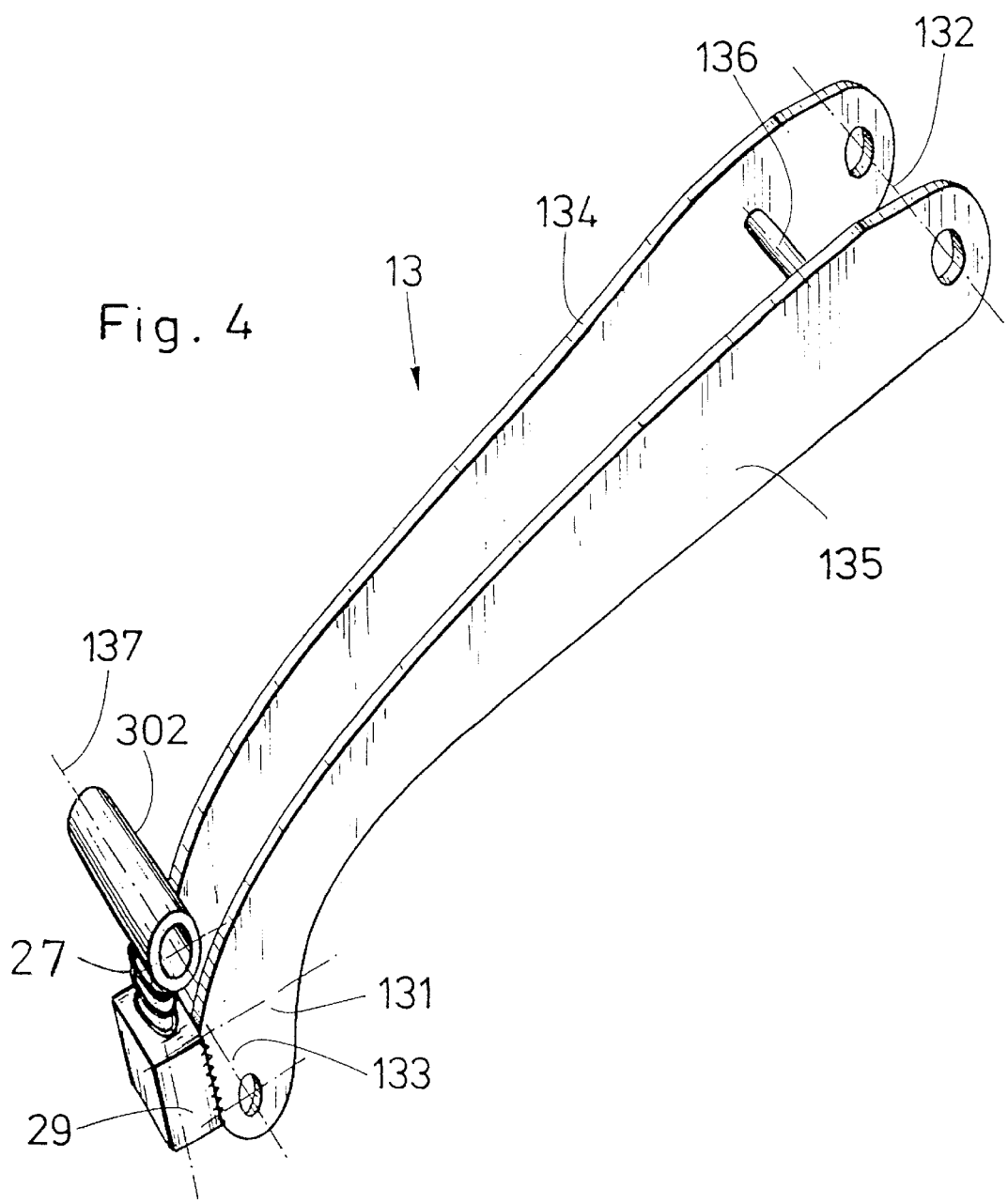
FIG. 4 shows in a perspective representation the first support arm which comprises two support arm elements which have second ends to which the guide member with the opening receiving the guide element is connected.

Reference is now made to FIG. 4, wherein the first support arm 13 consisting of two support arm elements 134, 135 is shown. A guide element 29 is attached to the second end 131 of the support arm 13 or, respectively, the support arm elements 134, 135. The guide element 29 is attached to the second end 131 of the support arm 13 by welding or by other attachment means. The guide element 29 includes an opening 290—see FIG. 3—into which a pin-like guide member 30 is guided so as to be axially movable therein. The guide member 30 includes a first end 300 and a second end 301. The first end 300 of the guide member 30 includes a sleeve portion 302 where in the axis of the sleeve portion 302 forms the pivot axis 137 of the loading platform 15—see also FIGS. 1 and 2. The guide member 30 is arrested relative to the guide element 29 in such a way that it cannot move out of the opening 290. A spring 28—see FIGS. 2, 3—is provided between the guide element 29 and the end 300 of the guide member 30 remote from the guide element 29. The spring 28 is consequently effective between the second end 131 of the support arm and the pivot axis 137 of the loading platform 15, which pivot axis extends essentially perpendicularly to the support arm 12. The spring 28 may be enclosed in a protective structure 27, which may be an elastic bellows.

The lifting or lowering of the loading platform 15 by the loading platform 10 according to the invention is effected by the lifting actuator 16, which may be in the form of a hydraulically and/or pneumatically operated lifting cylinder arrangement that is in the form of a conventional piston cylinder unit. The same is true for the tilting actuator 17 if the loading platform system 10 is of the type in which the platform 15 can be tilted from a horizontal to a vertical position. But it is also possible to provide an electrically operated lift actuator 16 and/or tilting actuator 17 that is each actuator may be an electrically operated actuator and designed accordingly.

The lifting of the loading platform 15 with the loading platform system according to the invention is performed generally in a conventional manner that is the lift actuator 16 is operated whereby the first support arm 13 and, by way of the transverse member 32 which also serves as a hit protection, also the second support arm 14 are lifted. In the quasi first upper end position of the lift actuator 16 there may be a vertical step between the plane defined by the loading platform 15 and the plane of the loading bed of the vehicle 11 which is not shown in the drawings. This step depends on the load on the loading platform which causes some elastic deformation of the structure transmitting the lifting forces from the lifting actuator 16 through the transverse member 32 and the support arm 14 to the loading platform 15. The loading platform however must be lifted to be flash with the loading bed of the vehicle. The lifting actuator 16 is then further operated against the force of the spring 28 until also the lifting arm 14 is in its top end position wherein the loading platform level reaches the level of the loading bed of the vehicle 11.

If the lift support structure 12 is also designed as a tilting structure, wherein the tilt actuator 17 is part of the parallelogram-like second support arm 14 so that a tilting movement of the loading platform 15 can be effected in a known way, the loading platform 15 can be tilted from a horizontal position to a vertical position and again back to the horizontal position by a suitable control of the tilting actuator 17. The lowering of the loading platform 15 is effected by the lifting actuator in a known manner.

What is claimed is:

1. A loading platform system for mounting on a vehicle comprising: a lift mechanism support structure, at least a first support arm having a first end connected to said lift mechanism support structure so as to be pivotable about a first pivot axis and an opposite second end, an essentially plate-like loading platform connected to said second end of said first support arm for supporting a load, at least one lifting actuator having a first end connected to said lift mechanism support structure and a second end connected to said first support arm for pivoting said first support arm and lifting and lowering said loading platform, said loading platform being pivotally supported by said first support arm by way of a pivot joint structure having a second pivot axis extending perpendicularly to said support arm, and spring means arranged between said second end of said first support arm and said pivot joint structure for resiliently supporting said loading platform on said first support arm.

2. A loading platform system according to claim 1, wherein said spring means is a compression spring.

3. A loading platform system according to claim 1, wherein said spring means comprises at least one of a hydraulic and pneumatic spring.

4. A loading platform system according to claim 1, wherein said spring means is effective between a guide element mounted to said second end of said first support arm and a guide member is movably supported in an opening formed in said guide element.

5. A loading platform system according to claim 4, wherein, at its end remote from said guide element, said guide member has a shaft support sleeve having an axis forming the pivot axis of said loading platform.

6. A loading platform system according to claim 1, wherein said spring means is enclosed in a protective envelope.

7. A loading platform system according to claim 6, wherein said protective envelope is an elastic bellows.

8. A loading platform according to claim 1, wherein said first support arm comprises two parallel spaced arm elements.

9. A loading platform according to claim 8, wherein said two spaced arm elements are interconnected by a web.

10. A loading platform according to claim 1, wherein said at least a first support arm comprises first and second support arms, which are provided in spaced relationship for supporting said loading platform and a transverse member extends between said first and second support arms for transferring the lifting forces from said first to said second support arm.

* * * * *